US007891853B2

(12) United States Patent
Park

(10) Patent No.: US 7,891,853 B2
(45) Date of Patent: Feb. 22, 2011

(54) APPARATUS AND METHOD FOR CONTROLLING OPERATION OF LED IN LIGHT UNIT

(75) Inventor: Seong-Soo Park, Gwangju-si (KR)

(73) Assignee: LG Innotek Co., Ltd., Seoul (KR)

( * ) Notice: Subject to any disclaimer, the term of this patent is extended or adjusted under 35 U.S.C. 154(b) by 324 days.

(21) Appl. No.: 11/707,914

(22) Filed: Feb. 22, 2007

(65) Prior Publication Data

US 2007/0195552 A1 Aug. 23, 2007

(30) Foreign Application Priority Data

Feb. 21, 2006 (KR) .................. 10-2006-0016976

(51) Int. Cl.
*F21V 7/04* (2006.01)
(52) U.S. Cl. .................. 362/611; 362/612; 362/613
(58) Field of Classification Search .......... 362/611–613
See application file for complete search history.

(56) References Cited

U.S. PATENT DOCUMENTS 6,903,716 B2 * 6/2005 Kawabe et al. ............. 345/99
2005/0259439 A1 * 11/2005 Cull et al. .................. 362/612
2006/0007103 A1 * 1/2006 Oh et al. .................... 345/102
2006/0197469 A1 * 9/2006 Kim .......................... 315/291
2009/0016076 A1 * 1/2009 Overes et al. .............. 362/612

* cited by examiner

*Primary Examiner*—Sandra L O Shea
*Assistant Examiner*—William J Carter
(74) *Attorney, Agent, or Firm*—Birch, Stewart, Kolasch & Birch, LLP

(57) ABSTRACT

Provided are an apparatus and method for controlling an operation of an LED in a light unit. The apparatus includes: a micom for sequentially outputting red, green and blue signals delayed by a predetermined interval through n (n>1) number of channels for each color; a plurality of light emitting diode (LED) drivers for outputting PWM dimming pulses according to the red, green and blue signals inputted through the n number of the channels; a plurality of switching elements for outputting driving currents according to the PWM dimming pulses; and n number of light subunits including a plurality of red, green and blue LED chips sequentially driven by the driving currents outputted from the switching elements.

20 Claims, 6 Drawing Sheets

APPARATUS AND METHOD FOR CONTROLLING OPERATION OF LED IN LIGHT UNIT

BACKGROUND OF THE INVENTION

1. Field of the Invention

The embodiment of the present invention relates to an apparatus and method for controlling operation of a light emitting diode (LED) in a light unit.

2. Description of the Related Art

In recent years, LEDs are widely used as a light source of a backlight unit for a liquid crystal display (LCD) panel to enhance color reproduction and obtain high brightness.

The backlight unit can be classified into an edge-type backlight unit and a direct-type backlight unit according to the method of using the light source. In the edge-type backlight unit, a light source is installed at the side of a light guide plate. The edge-type backlight unit has been applied to a relatively small-sized LCD device such as a handy terminal, while the direct-type backlight unit has been applied to medium and large-sized LCD devices larger than 20 inches.

In such a backlight unit, a plurality of LEDs each provided with red (R), green (G) and blue (B) LED chips are arranged in an array configuration. The same color LED chips are connected in series between the LEDs. Driving pulses are supplied to the LED chips, and white light obtained by mixing red, green and blue lights. THE red, green and blue light generated by the supply of the driving pulses is used as a light source for the backlight unit.

However, all chips of LEDs in the backlight unit are simultaneously turned on or off. When simultaneously turned on, synthetic harmonic waves are so much generated between the LED chips, so that wave noise may occur on a screen of an LCD panel. Consequently, the wave noise may distort a phase made on the LCD panel to deteriorate the quality of an image.

SUMMARY OF THE INVENTION

An embodiment of the present invention provides an apparatus and method for controlling operation of an LED in a light unit, which can reduce wave noise during the operation of the LED by preventing the LEDs emitting three colors from being simultaneously turned on or off.

An embodiment of the invention provides an apparatus for controlling an operation of an LED in a light unit, comprising: a micom for sequentially outputting red, green and blue signals delayed by a predetermined interval through n (n>1) number of channels for each color; a plurality of light emitting diode (LED) drivers for outputting PWM dimming pulses according to the red, green and blue signals inputted through the n number of the channels; a plurality of switching elements for outputting driving currents according to the PWM dimming pulses; and n number of light subunits including a plurality of red, green and blue LED chips sequentially driven by the driving currents outputted from the switching elements.

An embodiment of the invention provides a method for controlling an operation of an LED in a light unit, comprising: sequentially outputting red, green and blue signals delayed by a predetermined interval through n number of channels for each color; outputting PWM dimming pulses according to the red, green and blue signals inputted through the n number of the channels at drivers corresponding to the n number of the channels; outputting driving currents according to the PWM dimming pulses; and sequentially driving red, green and blue LED chips corresponding to the n number of the channels by a predetermined interval in response to the driving currents According to the present invention, the LED chips emitting three colors can be sequentially turned on or off by a predetermined interval, thereby reducing wave noise involved in the composite light.

It is to be understood that both the foregoing general description and the following detailed description of the present invention are exemplary and explanatory and are intended to provide further explanation of the invention as claimed.

DETAILED DESCRIPTION OF THE INVENTION

Reference will now be made in detail to the preferred embodiments of the present invention, examples of which are illustrated in the accompanying drawings.

Figure 1:
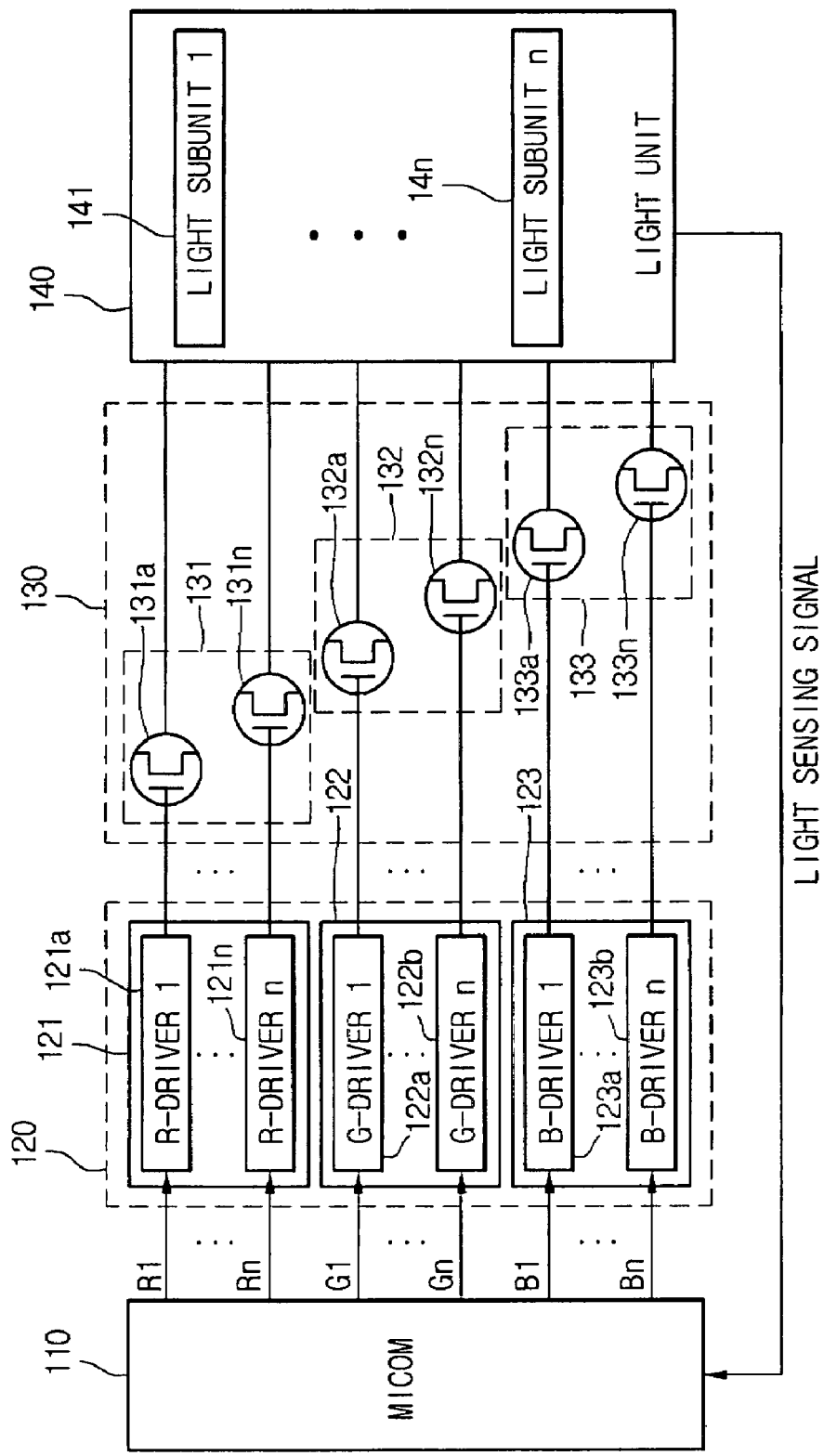
FIG. 1 is a view showing an apparatus for controlling operation of an LED in a light unit according to an embodiment of the present invention.
Figure 2:
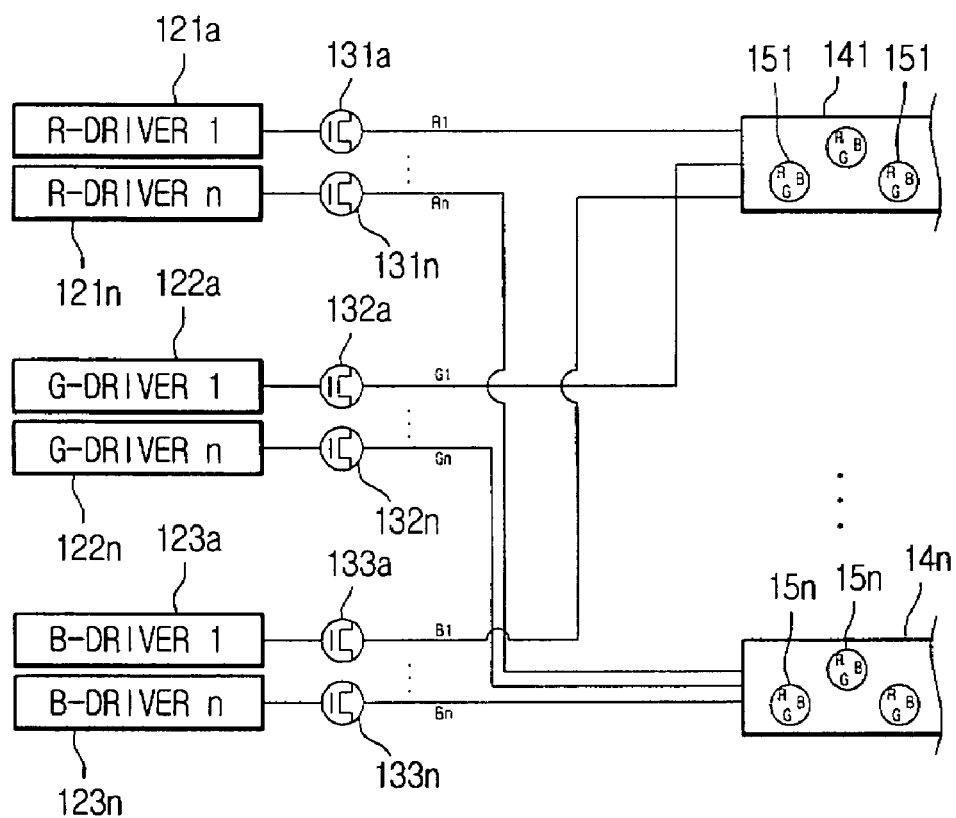
FIG. 2 is a view showing an example of connection between an LED drivers and a light subunits according to an embodiment of the present invention.

FIG. 1 is a view showing an apparatus for controlling operation of an LED in a light unit according to an embodiment of the present invention, and FIG. 2 is a detail view of the LED drivers and light subunits shown in FIG. 1.

Referring to FIGS. 1 and 2, the apparatus 100 for controlling operation of an LED includes a micom(micro computer) 110, a driver unit 120, a switch unit 130 and a light unit 140.

The micom 110 outputs red, green and blue signals in response to a control signal for driving LEDs of the light unit 140. When a light source is needed to drive an LCD device, the LED drive control signal is used to control a backlight or front light unit (hereinafter, simply referred to as "light unit") to generate and irradiate light.

The micom 110 delay red, green and blue signals at predetermined time intervals such that the red, green and blue signals are sequentially outputted through n (n>1) number of channels. The red signals R1~Rn are sequentially outputted with a predetermined delay through n number of channels. The green signals G1~Gn are sequentially outputted with a predetermined delay through n number of channels. The blue signals B1~Bn are sequentially outputted with a predetermined delay through n number of channels. Herein, all signals are delayed by the same time interval.

Herein, the micom 110 can synchronize all color signals at initial operation. Accordingly, a problem caused by wave noise does not occur even when LED chips are turned on or off by red, green and blue signals synchronized at the initial operation.

Also, the micom 110 sequentially outputs the color signals in the order of red, green and blue signals at a predetermined time interval. That is, after the red signals are outputted, the green signals are outputted. Finally, the blue signals can be outputted following the green signals. This output order can be modified by a designer.

The micom 110 detects the color data and the strength of the light emission of the red, green and blue LED chips through a light sensor 149. Thereafter, the micom 110 corrects and outputs the strength of the red, green and blue signals. That is, after the micom receives a light sensing signal from the light sensor 149, the micom makes a color balance by outputting an appropriate amount of duty to satisfy a target value that a user wants.

The driver unit 120 includes red, green and blue driver part 121, 122 and 123 connected to n number of channels. The red driver part 121 is comprised of n number of red drivers 121a to 121n and outputs a periodic PWM dimming pulse sequentially by the red signals inputted through n number of channels. The green driver part 122 is comprised of n number of green drivers 122a to 122n and outputs a periodic PWM dimming pulse sequentially by the green signals inputted through n number of channels. The blue driver part 123 is comprised of n number of blue drivers 123a to 123n and outputs a periodic PWM dimming pulse sequentially by the blue signals inputted through n number of channels.

The switch unit 130 includes red, green and blue switch part 131, 132 and 133. The red switch part 131 is comprised of n number of switching elements 131a to 131n and outputs a driving current when the respective switching elements 131a to 131n are turned on or off by the PWM dimming pulse which is sequentially inputted. The green switch part 132 is comprised of n number of switching elements 132a to 132n and outputs a driving current when the respective switching elements 132a to 132n are turned on or off by the PWM dimming pulse which is sequentially inputted. The blue switch part 133 is comprised of n number of switching element 133a to 133n and outputs a driving current when the respective switching elements 133a to 133n are turned on or off by the PWM dimming pulse which is sequentially inputted.

Herein, the driver unit 120 and switch unit 130 can be implemented with a driver IC and the switching element can be implemented with a MOSFET.

The light unit 140 is embodied as a direct-type backlight or front light unit having n number of light subunits 14l to 14n arranged in parallel. Each of the light subunits 141 to 14n includes a plurality of red, green and blue chips which are connected to the same color chips in series, and respective LED chips connected to a signal line of each color are operated by the driving current. Also, the light unit 140 includes a light sensor 149, which senses light followed by a characteristic change of the LED chips and delivers the light to the micom 110.

As shown in FIG. 2, a plurality of light subunits 14l to 14n is arranged in parallel in the light unit 140. Each of the light subunits 14la~14ln is comprised of a plurality of LEDs 151 to 15n, each LED 151 to 15n is provided with red, green and blue LED chips in a packaging state wherein the LED chips having the same color are mutually connected in series.

And then, the PWM dimming pulses outputted from the drivers 121a to 121n, 122a to 122n and 123a to 123n for each color are sequentially inputted into the corresponding switching elements 131a to 131n, 132a to 132n and 133a to 133n. The respective switching elements 131a to 131n, 132a to 132n and 133a to 133n are sequentially turned on or off to supply the LED chips for each color of the light subunits 141 to 14n with the driving current so that the LED chips for each color are sequentially turned off or on.

In other words, the red chips of each of the light subunits 141 to 14n are sequentially turned on (or off) at a predetermined time interval. Next, the green LED chips of each of the light subunits 141 to 14n are sequentially turned on or off. Finally, the blue LED chips of each of the light subunits 141 to 14n are sequentially turned on (or off).

In this way, the respective color signals are sequentially delayed and inputted into a signal line of the LED chips connected to each of the light subunits 141 to 14n in series, so that the LED chips for each signal line are sequentially turned on or off with a predetermined time interval.

Figure 3:
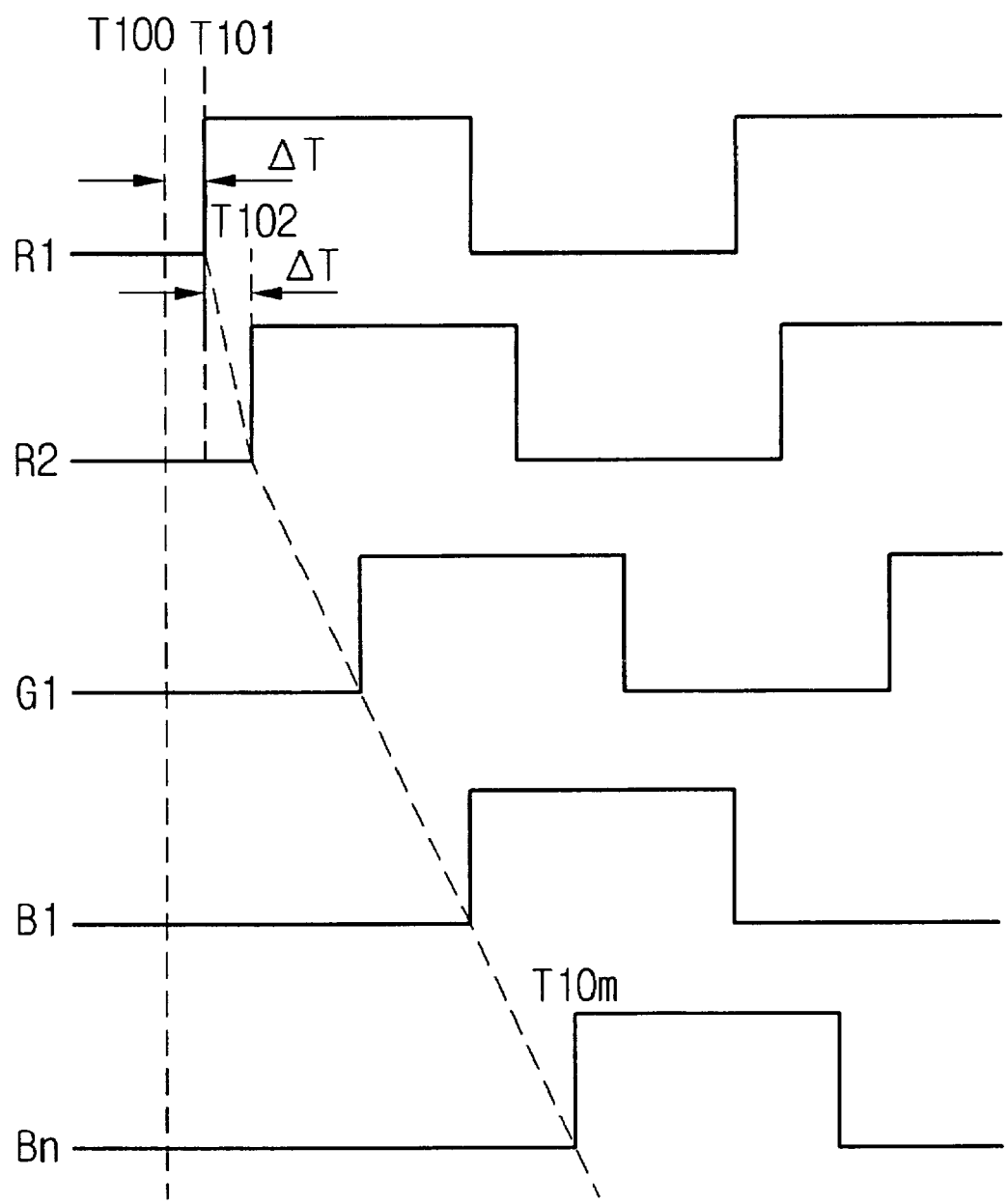
FIG. 3 is a waveform diagram showing signals outputted from an LED drivers.

Meanwhile, even if the LED chips of each of the light subunits 141 to 14n are not simultaneously turned on or off, the sections where three LED chips are turned on or off overlap, as shown in FIG. 3, so that white light is produced.

FIG. 3 is an example of waveform diagram showing signals according to an embodiment of the present invention.

As shown in FIG. 3, a first red signal R1 is delayed by time $\Delta T$ from an initial operation time T100. There is also a time gap $\Delta T$ between adjacent signals R1 and R2. All signals are sequentially delayed by such a delay time $\Delta T$ and repeated through m number of channels. Herein, the present invention can control all LED chips to be simultaneously turned on at the initial operation time T100, and then delayed by a delay time as shown in FIG. 3.

Figure 4:
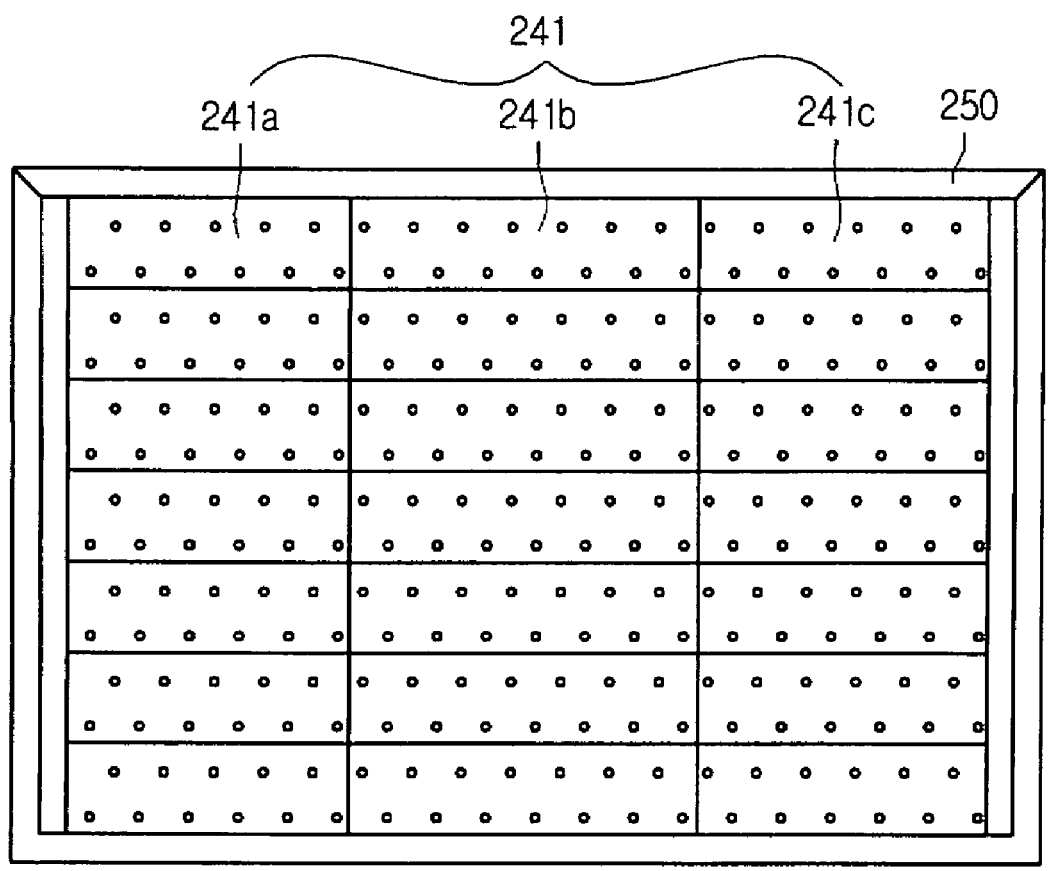
FIG. 4 is a view showing an example of an LED array in a light unit according to an embodiment of the present invention.

Meanwhile, FIG. 4 is a view showing a structure of a light unit according to an embodiment of the present invention.

Figure 5:
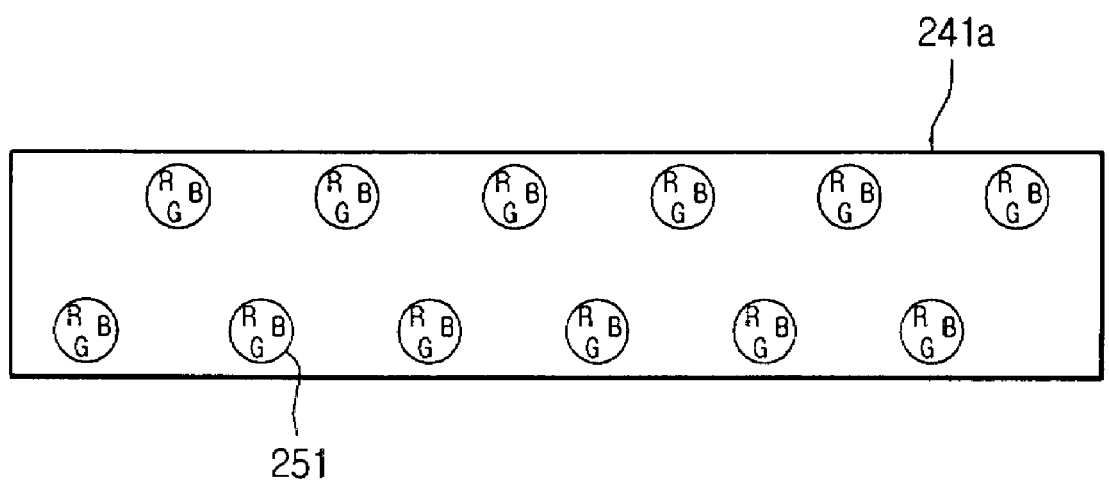
FIG. 5 is a detail view of an LED module in FIG. 4.

As shown in FIG. 4, a light subunit, e.g., seven LED bar 241 are arranged in a bottom cover 250. Each LED bar 241 includes three LED modules 241a, 241b and 241c in series in which, as shown in FIG. 5, twelve LEDs 251 are arranged in zigzag pattern. Each LED 251 is used as a cluster mounted with a red, a green and a blue color LED chips. Since a light unit 140 includes seven LED bars having three signal lines per a LED bar, it needs signal channels corresponding to 27 signal lines.

A delay time can be obtained by using the 27 signal lines and a usable frequency. For example, when f=750 Hz, the period T and the delay time $\Delta T$ can be obtained using $T=1/f$ and $\Delta T=T/27$ respectively. At this point, $\Delta T$ is about 480 μs.

The delay time according to the present invention can be obtained by dividing period T or T/2 into 9 equal parts. For example, $\Delta T$ can be T/9 or T/18. Accordingly, the delay time of the present invention can be obtained in the range of the values obtained by dividing a period by a value of 9 to the total number of the channels.

According to the present invention, the phase is shifted by a predetermined delay tire by adjusting each duty ratio of the clock pulses. In this manner, a synchronizing time can be reduced in turning on or off the color LED chips arranged in parallel, thereby suppressing the generation of wave noise. Therefore, the light unit according to the present invention can maintain the high color reproduction and the normal brightness uniformity and can also adjust the entire brightness through the overall RGB dimming.

Figure 6:
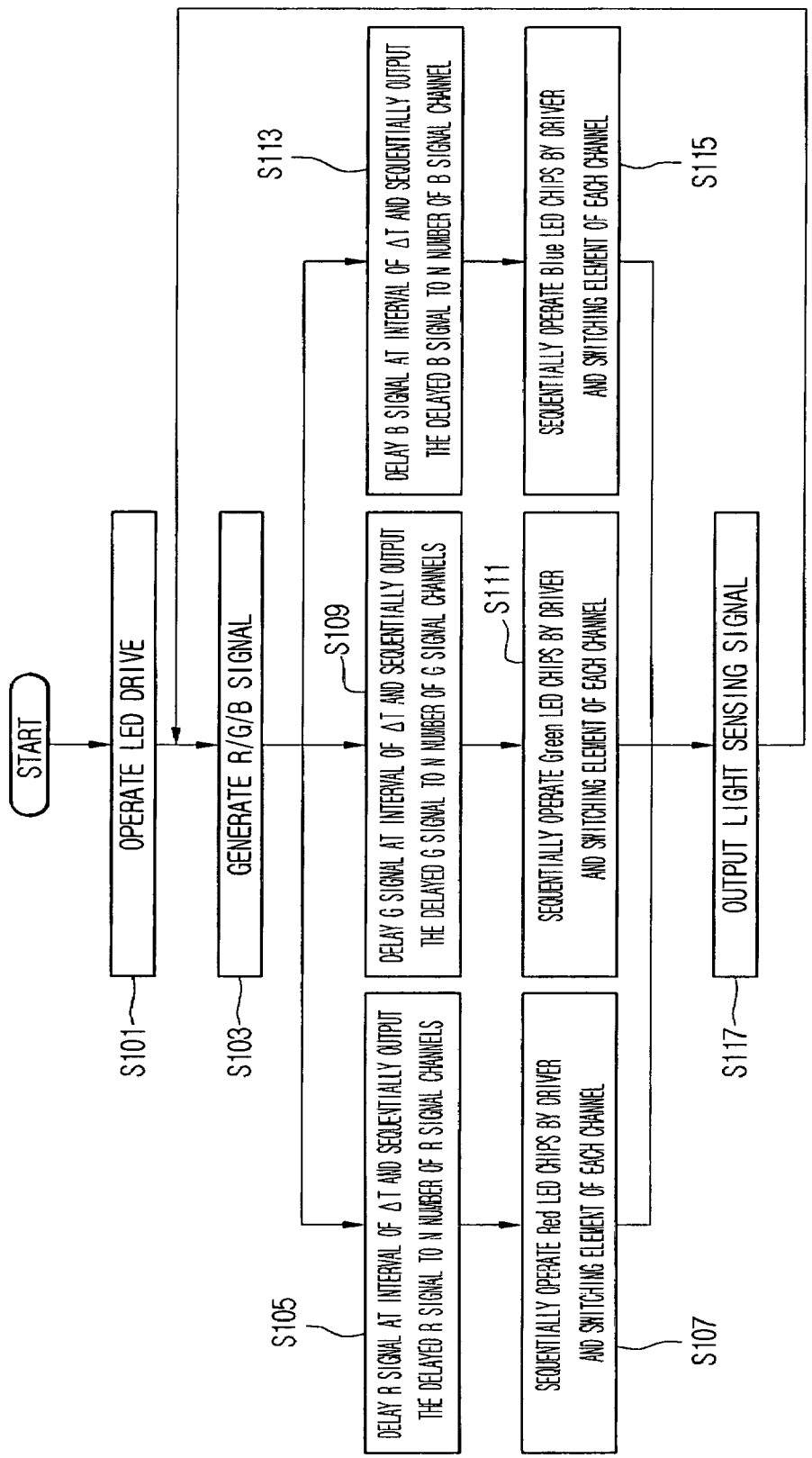
FIG. 6 is a flowchart showing a method of controlling operation of an LED in a light unit according to an embodiment of the present invention.

FIG. 6 is a view showing a method of controlling operation of an LED according to an embodiment of the present invention.

Referring to FIG. 6, the micom generates red, green and blue signals in response to the LED drive control signal (S101, S103). At this point, the red, green and blue signals are outputted in a predetermined order.

The red signals are respectively delayed by a time interval ($\Delta T$) and are sequentially outputted through n number of red signal channels (S105). Thereafter, red chips are sequentially turned on or off by the drivers and the switching elements connected to the n number of the red signal channels (S107). After the red signals are sequentially outputted, the green signals are outputted.

The green signals are respectively delayed by the time interval (ΔT) and are sequentially outputted through n number of green signal channels (S109). Thereafter, green chips are sequentially turned on or off by the drivers and the switching elements connected to the n number of the green signal channels (S111). After the green signals are sequentially outputted, the blue signals are outputted.

The blue signals are respectively delayed by the time interval (ΔT) and are sequentially outputted through n number of blue signal channels (S113). Thereafter, blue chips are sequentially turned on or off by the drivers and the switching elements connected to the n number of the blue signal channels (S115).

The light sensor 149 senses light generated by the sequentially turned-on red, green and blue LED chips and outputs the light sensing signal to the micom (S117). The micom generates the signal in which the respective colors are corrected using the light sensing signal.

According to the present invention, the apparatus for controlling the operation of the LED can minimize wave noise in the LCD panel by sequentially controlling the operation of the LEDs mounted in the light unit of the medium or large-sized LCD panel.

In addition, the synchronizing time between the LED chips can be reduced by delaying the operation time point of the same LED chips and the different LED chips, thereby minimizing the generation of wave noise.

Furthermore, the light unit according to the present invention can enhance the reliability of the backlight unit and the LCD device having the medium and large-sized panels.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for controlling an operation of an LED in a light unit, comprising:
   a micro computer configured to sequentially output signals through each channel of a plurality of channels, the plurality of channels including a plurality of red channels, a plurality of green channels and a plurality of blue channels;
   a plurality of light emitting diode (LED) drivers configured to output pulse width modulation (PWM) dimming pulses for each channel of the plurality of channels;
   a plurality of switching elements configured to sequentially output, for each channel of the plurality of channels, driving currents according to the PWM dimming pulses;
   a plurality of light subunits configured to be sequentially driven by the driving currents, each light subunit corresponding to one of the plurality of channels,
   wherein the plurality of light subunits are arranged in parallel,
   wherein each light subunit comprises a red series of serially connected red LED chips, a green series of serially connected green LED chips and a blue series of serially connected blue LED chips, and
   wherein, based on the sequentially output signals, turn-on times of each red series are sequentially delayed by a first predetermined interval, turn-on times of each green series are sequentially delayed by a second predetermined interval, and turn-on times of each blue series are sequentially delayed by a third predetermined interval, thereby reducing the generation of wave noise during an operation of the red LED chips, the green LED chips and the blue LED chips.

2. The apparatus according to claim 1, wherein the first, second and third predetermined intervals are a common interval.

3. The apparatus according to claim 2, wherein the common interval is set within a range obtained by dividing a clock period of the signal by a value of 9 to a total number of the channels.

4. The apparatus according to claim 2, wherein the common interval is at least 148 μs.

5. The apparatus of claim 2, wherein a turn-on time of a first green series follows a turn-on time of a last red series by the common interval, and a turn-on time of a first blue series follows a turn-on time of a last green series by the common interval.

6. The apparatus according to claim 1, wherein an initial turn-on time of a first red series is delayed from an initial operation time by the first predetermined interval.

7. The apparatus according to claim 1, wherein all blue series are turned on after all green series are turned on, which is after all red series are turned on.

8. The apparatus according to claim 1, wherein each of the plurality of light subunits is packaged into an LED module.

9. The apparatus according to claim 1, further comprising:
   a light sensor configured to feedback light sensing signals to the micro computer, the light sensing signals being generated according to an operation of the plurality of light subunits.

10. The apparatus according to claim 1, wherein based on the sequentially output signals, turn-off times of each red series are sequentially delayed by a first predetermined interval, turn-off times of each green series are sequentially delayed by a second predetermined interval, and turn-off times of each blue series are sequentially delayed by a third predetermined interval, thereby reducing the generation of wave noise during an operation of the red LED chips, the green LED chips and the blue LED chips.

11. The apparatus according to claim 1, wherein portions of illumination times of a red series, a green series and a blue series are overlapped so that white light is produced.

12. The apparatus according to claim 1, further comprising:
   a bottom cover arranged to place the plurality of light subunits in a 1:1 correspondence with the plurality of channels.

13. A method for controlling an operation of an LED in a light unit, comprising:
   sequentially outputting signals through each channel of a plurality of channels, the plurality of channels including a plurality of red channels, a plurality of green channels and a plurality of blue channels;
   outputting pulse width modulation (PWM) dimming pulses for each channel of the plurality of channels;
   sequentially outputting, for each channel of the plurality of channels, driving currents according to the PWM dimming pulses;
   sequentially driving a plurality of light subunits with the driving currents, each light subunit corresponding to one of the plurality of channels,
   wherein the plurality of light subunits are arranged in parallel,
   wherein each light subunit comprises a red series of serially connected red LED chips, a green series of serially connected green LED chips and a blue series of serially connected blue LED chips, and wherein, based on the sequentially output signals, turn-on times of each red series are sequentially delayed by a first predetermined interval, turn-on times of each green series are sequentially delayed by a second predetermined interval, and turn-on times of each blue series are sequentially delayed by a third predetermined interval, thereby reducing the generation of wave noise during an operation of the red LED chips, the green LED chips and the blue LED chips.

14. The method according to claim 13, wherein the sequentially output signals are corrected by light sensing data feedback according to the operation of the plurality of light subunits.

15. The method according to claim 13, wherein an initial turn-on time of a first red series is delayed from an initial operation time by the first predetermined interval.

16. The method according to claim 13, wherein the first, second and third predetermined intervals are a common interval.

17. The method of claim 16, wherein a turn-on time of a first green series follows a turn-on time of a last red series by the common interval, and a turn-on time of a first blue series follows a turn-on time of a last green series by the common interval.

18. The method according to claim 13, wherein all blue series are turned on after all green series are turned on, which is after all red series are turned on.

19. The method according to claim 13, wherein portions of illumination times of a red series, a green series and a blue series are overlapped so that white light is produced.

20. The method according to claim 13, wherein an initial turn-on time of a first red series is delayed from an initial operation time by the first predetermined interval.

* * * * *